(12) United States Patent
Schechner et al.

(10) Patent No.: US 11,774,185 B2
(45) Date of Patent: Oct. 3, 2023

(54) DEVICE FOR ENERGY TRANSFER AND FOR ENERGY STORAGE IN A LIQUID RESERVOIR

(71) Applicant: Envola GmbH, Ulm (DE)

(72) Inventors: Alexander Schechner, Ulm (DE); Guenther Schwenk, Heidenheim (DE)

(73) Assignee: ENVOLA GMBH, Ulm (DE)

( * ) Notice: Subject to any disclaimer, the term of this patent is extended or adjusted under 35 U.S.C. 154(b) by 127 days.

(21) Appl. No.: 17/621,427

(22) PCT Filed: Jul. 3, 2020

(86) PCT No.: PCT/EP2020/068821
§ 371 (c)(1),
(2) Date: Dec. 21, 2021

(87) PCT Pub. No.: WO2021/004937
PCT Pub. Date: Jan. 14, 2021

(65) Prior Publication Data
US 2022/0357111 A1    Nov. 10, 2022

(30) Foreign Application Priority Data
Jul. 5, 2019 (DE) .................. 10 2019 118 223.9

(51) Int. Cl.
*F28D 20/00* (2006.01)
(52) U.S. Cl.
CPC .............................. *F28D 20/0043* (2013.01)

(58) Field of Classification Search
CPC .... F28D 20/0043; F28D 1/024; F28D 1/0408; F28D 1/0461; F28D 20/0052; F28F 9/013
See application file for complete search history.

(56) References Cited

U.S. PATENT DOCUMENTS

| | | | | |
|---|---|---|---|---|
| 2,529,154 | A * | 11/1950 | Hammond | .......... F24D 11/0221 62/235.1 |
| 10,049,776 | B2 * | 8/2018 | Wattenburg | ............. F01D 15/10 |
| 10,816,269 | B2 * | 10/2020 | Hietbrink | ................ F28F 19/00 |

(Continued)

FOREIGN PATENT DOCUMENTS

| | | |
|---|---|---|
| DE | 29 26 610 A1 | 1/1981 |
| DE | 20203713 U1 | 12/2002 |

(Continued)

OTHER PUBLICATIONS

International Search Report in PCT/EP2020/068821, dated Nov. 17, 2020.

*Primary Examiner* — Jon T. Schermerhorn, Jr.
(74) *Attorney, Agent, or Firm* — Collard & Roe, P.C.

(57) ABSTRACT

A device for energy transfer and for energy storage in a liquid reservoir has a water heat exchanger arranged on a bottom and has an air heat exchanger arranged above the water heat exchanger, wherein the water heat exchanger is arranged in a liquid reservoir that is surrounded by an inner shell which delimits the device with respect to an outer shell covering the inner shell from the bottom, wherein the outer shell is at least partially inserted into an earth layer, and the device is closed upwardly by a lid in such a way as to make it possible to generate a flow of air from an air inlet to an air outlet of the air heat exchanger.

15 Claims, 6 Drawing Sheets

(56) References Cited

U.S. PATENT DOCUMENTS

Figure 1:
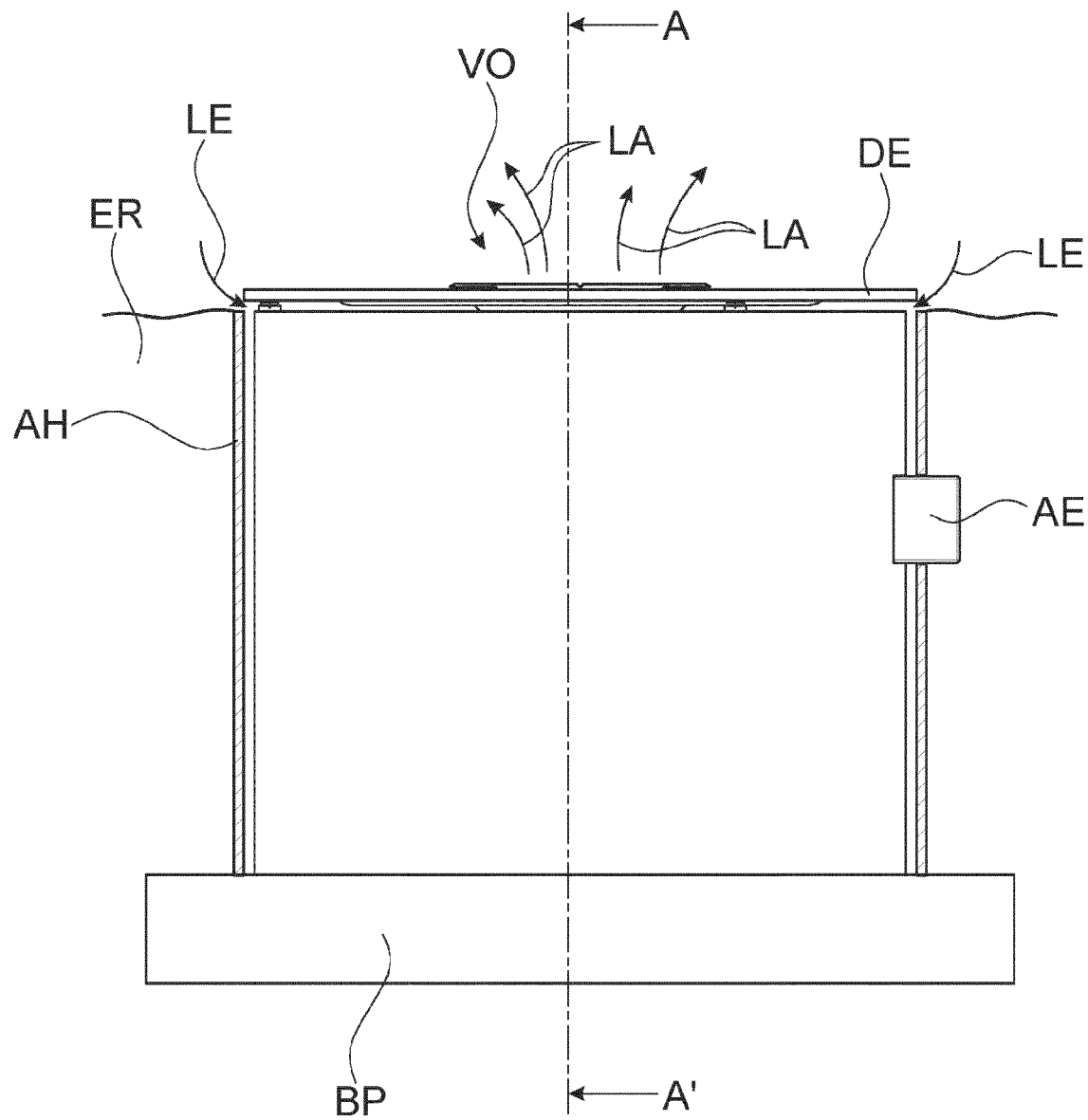

2012/0318474 A1* 12/2012 Lieskoski ............... F24T 10/13
                                                              165/45
2018/0106131 A1*  4/2018 Kanstad ................ E21B 43/017
2018/0112930 A1   4/2018 Schechner et al.
2018/0356163 A1  12/2018 Schechner et al.

FOREIGN PATENT DOCUMENTS

| DE | 102005037997 A1 | 2/2007 |
| DE | 10 2015 104 909 B3 | 9/2016 |
| DE | 10 2015 121 177 A1 | 6/2017 |
| EP | 2 302 311 A1 | 3/2011 |
| WO | 2017/093426 A1 | 6/2017 |

* cited by examiner

DEVICE FOR ENERGY TRANSFER AND FOR ENERGY STORAGE IN A LIQUID RESERVOIR

CROSS REFERENCE TO RELATED APPLICATIONS

This application is the National Stage of PCT/EP2020/068821 filed on Jul. 3, 2020, which claims priority under 35 U.S.C. § 119 of German Application No. 10 2019 118 223.9 filed on Jul. 5, 2019, the disclosure of which is incorporated by reference. The international application under PCT article 21 (2) was not published in English.

The invention relates to a device for energy transfer and for energy storage in a liquid reservoir.

The use of fossil fuels is not only becoming increasingly inefficient, but is also being increasingly questioned because of the negative effects on climate that are connected with it. Aside from an increase in the use of regenerative energy sources, efficient systems for energy storage are also increasingly needed, which, in combination with intelligent controls, can ensure reduced energy consumption in the heating of buildings or the cooling of systems. On the basis of such measures, it is possible to create a great savings potential, independent of the energy carrier used, and this also compensates for the installation costs connected with them.

A storage unit for making the input heat energy for heat pump systems available at a low temperature level is known from DE 29 26 610 A1, which systems absorb this energy and dispense it again at a higher temperature level. In this regard, a water basin is structured in such a manner that its water content can freeze without damage to the basin, and that a heat exchanger system situated on the basin bottom or recessed into the basin bottom makes it possible to supply the cooling and freezing heat of this basin to the cold side of a heat pump.

Aside from the use of an artificial water basin, it is also known to use natural bodies of water as a storage medium. Thus, an energy storage unit DE 10 2015 104 909 A1, which unit has a heat exchanger that is arranged to float on a lower basin, which can preferably be filled with water by way of a first feed line, and is configured as a lake, wherein water from the lower basin can be supplied to a heat pump by way of a second feed line, and coolant that penetrates the heat exchanger can be supplied to the heat pump by way of a third feed line, in separate circuits, so that energy can be extracted from the water of the lower basin by way of the heat exchanger, causing the water of the lower basin to freeze, or in the form of palpable heat, and passed on to a consumer for heat output and/or for cold output.

Furthermore, a floating device for introducing heat energy into a body of water as well as for extracting heat energy from the body of water is known from DE 10 2015 121 177 A1, which device has a water heat exchanger that is immersed in the body of water after the device has been set into it, and has an inflow and an outflow for a heat carrier fluid that can dispense heat energy to the body of water or extract heat energy from the body of water. Furthermore, the device has an air heat exchanger, which can be penetrated by ambient air and furthermore has an inlet for water coming from the body of water, with a corresponding outlet, so that water from the body of water can flow through the air heat exchanger, wherein heat energy can be transferred between the ambient air that flows through the air heat exchanger and the water that flows through the air heat exchanger.

Proceeding from this state of the art, the inventors have now set themselves the task of creating a device for energy transfer and for energy storage in a liquid reservoir, which can be used even without a natural body of water and furthermore is particularly easy to install.

This task is accomplished by means of the characteristics of claim 1. Further advantageous embodiments of the invention are the object of the dependent claims, in each instance. These can be combined with one another in a technologically practical manner. The specification, in particular in connection with the drawing, additionally characterizes and specifies the invention.

According to the invention, a device for energy transfer and for energy storage in a liquid reservoir is created, which device has a water heat exchanger arranged on a bottom, and an air heat exchanger arranged above the water heat exchanger, wherein the water heat exchanger is arranged in a liquid reservoir that is surrounded by an inner shell that delimits the device relative to an outer shell that covers the inner shell from the direction of the bottom, wherein the outer shell is introduced, at least partially, into an earth layer, and the device is closed off by means of a lid in the upward direction, in such a manner that an air stream through the air heat exchanger can be produced from an air inlet to an air outlet.

Accordingly, the device according to the invention can be divided into three sections, of which the water heat exchanger is arranged bottommost in the liquid reservoir. The air heat exchanger, through which the ambient air can flow, is arranged in the upper region. Above this air heat exchanger, the lid is arranged, which can be structured accordingly so as to create a region that can be used for other purposes, for example in a garden of a house, if the device according to the invention is recessed into the ground up to its lid. Typically, the active regions of the water heat exchanger and the air heat exchanger are connected with a heat pump by way of a hydraulic unit, and a glycol/water mixture typically flows through them for energy exchange. In this regard, energy exchange can take place in different ways. First of all, it is possible to extract ambient heat from the air heat exchanger for heating purposes, by way of the heat pump. In this regard, excess ambient heat can simultaneously be passed into the water heat exchanger. If insufficient ambient heat from the air heat exchanger is now available for heating purposes, this heat can be extracted from the water heat exchanger. Available useful heat from the heat exchanger can be branched off and in turn passed to the water heat exchanger for regeneration and charging of the storage unit. Aside from the extraction of ambient heat from the air heat exchanger, heat can also be given off by way of the heat exchanger for cooling purposes. In this regard, cold can partially be branched off and passed to the water heat exchanger as active pre-cooling of the storage unit. A corresponding amount of cold can also be extracted from the water heat exchanger, so as to dispense heat for cooling purposes by way of the heat pump, by means of the air heat exchanger. Finally, it is also possible to achieve free pre-cooling of the storage unit for free pre-cooling of the water heat exchanger, in order to dispense free cooling by way of the air heat exchanger. In the end result, the device will increase the efficiency of the production of useful heat, since the water heat exchanger can shift ambient heat from warm days to the not so efficient cold days, and in this regard clearly increases efficiency. It can be assumed that the device according to the invention practically entirely avoids direct electric supplemental heating or clearly reduces it. In connection with cooling of buildings and/or machines the effect of the device according to the invention is even more marked, since the coolness of the night is introduced into the storage unit, so as to support production of cold during the day, by means of low source temperatures.

Aside from this increase in efficiency, the device according to the invention is structured in such a manner that it clearly facilitates installation and operation of such a system. For this purpose, the outer shell is first inserted into the ground, which can be supported by a stable core during installation in order to prevent corresponding denting. The liquid reservoir is formed in the interior of the inner shell, wherein after removal of the core, the inner shell can be pulled up against the outer shell so as to stabilize it; this is achieved in that the outer shell covers the inner shell from the direction of the bottom. This allows a simple structure of the device according to the invention, which can furthermore also be installed in a cost-advantageous manner.

According to an embodiment of the invention, an insulation layer is arranged between the water heat exchanger and the air heat exchanger, wherein a seal can be affixed between the insulation layer and the outer shell, which seal can be formed as a circumferential cuff or a partially circumferential cuff, for example.

Accordingly, it is possible to insulate the region of the water heat exchanger from that of the air heat exchanger, wherein the combination of water heat exchanger, air heat exchanger, and insulation layer can be provided as a structural unit that is introduced into the outer shell. By forming a cuff, the corresponding insulation effect can be completed after insertion of the unit into the outer shell.

According to a further embodiment of the invention, a stud frame is provided at a distance from the outer shell, affixed to the bottom, which frame carries the lid. In this regard, the stud frame can be composed of multiple vertical supports that can be provided with an adjustment mechanism on the side facing the lid, so as to align the position of the lid. In this regard, the stud frame can be provided with an at least partially circumferential ring segment that serves as an upper end of the inner sleeve. In this regard, the inner sleeve can be structured as a flexible film that is suspended in the ring segment.

Accordingly, a mechanically stable structure of the device is created by means of few components, into which device the air heat exchanger and the water heat exchanger can be inserted and subsequently filled with the liquid of the liquid reservoir. In this regard, an adjustment mechanism that faces the lid allows equalization of inclination angles between the bottom and the desired position of the lid, within certain limits, while the inner sleeve, as a flexible film, adapts to possible unevenness. The stud frame can be joined together on the bottom in a simple manner, wherein preferably, the bottom can be structured in the form of a concrete bottom plate. This allows clear simplification of the preparatory excavation work for installation of the device. The lid can also be structured in multiple parts and accordingly can have separate adjustment mechanisms.

According to a further embodiment of the invention, the air inlet is configured in slit form along the outer circumference of the lid. In this regard, the lid can be arranged with the air outlet in the center of the lid, wherein a fan can be arranged below the lid, at the air outlet.

This method of procedure allows supplying ambient air to the air heat exchanger in a simple manner. After cold or heat is exchanged by way of the air heat exchanger, it leaves the region of the air heat exchanger by way of the air outlet, wherein the air stream can be produced by means of a fan.

In particular, it is provided that the lid is provided with one or more depressions, which can either be filled with soil as a planting bed, or can also be filled with water as a water feature. This makes it possible to create a natural appearance of the device, wherein in yet other cases of application, the possibility of driving or walking on the lid can also be achieved. Based on this method of procedure, it is possible that the area to be made available for the device in the region of a garden of a house, for example, can nevertheless continue to be used.

Typically, water can be introduced into the liquid reservoir as a liquid medium, wherein, however, other liquids, in particular paraffin compounds or the like, can also be used. Since it is not a natural body of water that is being used, according to the invention, the selection of the liquid medium is not restricted to water here.

Because of the flexibly structured inner shell, the hydrodynamic pressure in the liquid reservoir can press this shell against the outer shell, and this also stabilizes the outer shell further relative to the ground.

According to further embodiments of the invention, the air heat exchanger and the water heat exchanger are each structured with a plurality of pipes arranged in a circle, which are connected with a connection unit by way of inflow and outflow lines. In this regard, the connection unit, which is typically arranged between the water heat exchanger and the air heat exchanger, can pass through the outer shell.

Accordingly, it is possible to create a connection of the heat pump, which is typically situated in the building, with the device according to the invention, as early as during introduction of the outer shell into the ground, and this connection can take place by way of the connection unit.

Since the outer shell and the unit comprising the air heat exchanger and the water heat exchanger are introduced sequentially, connection lines can first be laid in the ground to the connection unit, so that the space within the outer shell remains free at first. After installation of the heat exchangers, corresponding feed lines are now passed from the inner side to the connection unit. These lines can be arranged radially at first, so as not to disrupt installation of the unit, and subsequently be passed to the corresponding connection locations.

In a particularly preferred embodiment, the air heat exchanger and the water heat exchanger are structured in such a manner that the device has an essentially cylindrical outer shape.

A device structured in this manner can be transported to the location of use in a simple manner, and can also be speedily installed in the free space provided, after completion of the excavation work and removal of a stabilized core, if applicable.

Figure 2A:
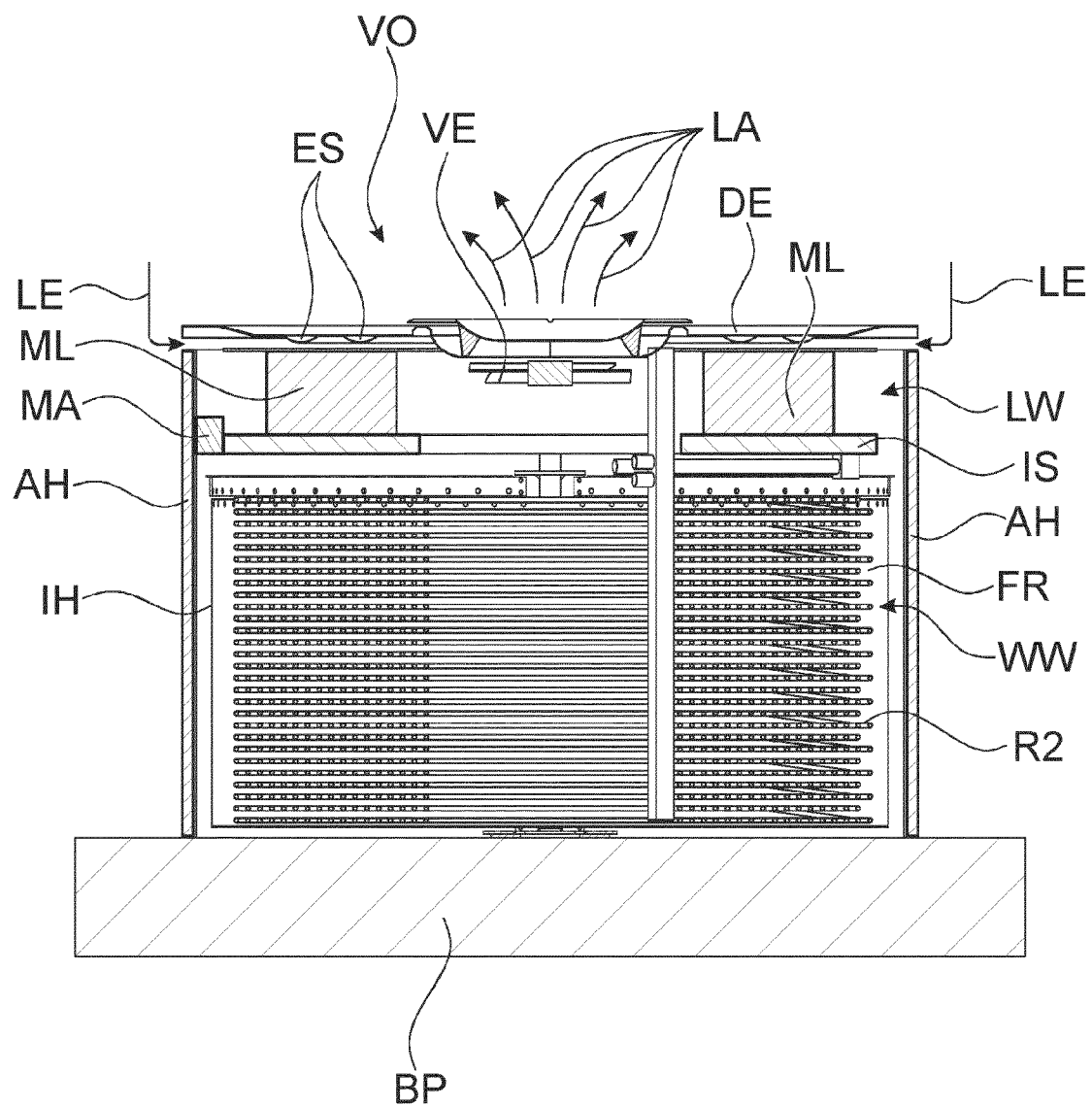
Figure 2B:
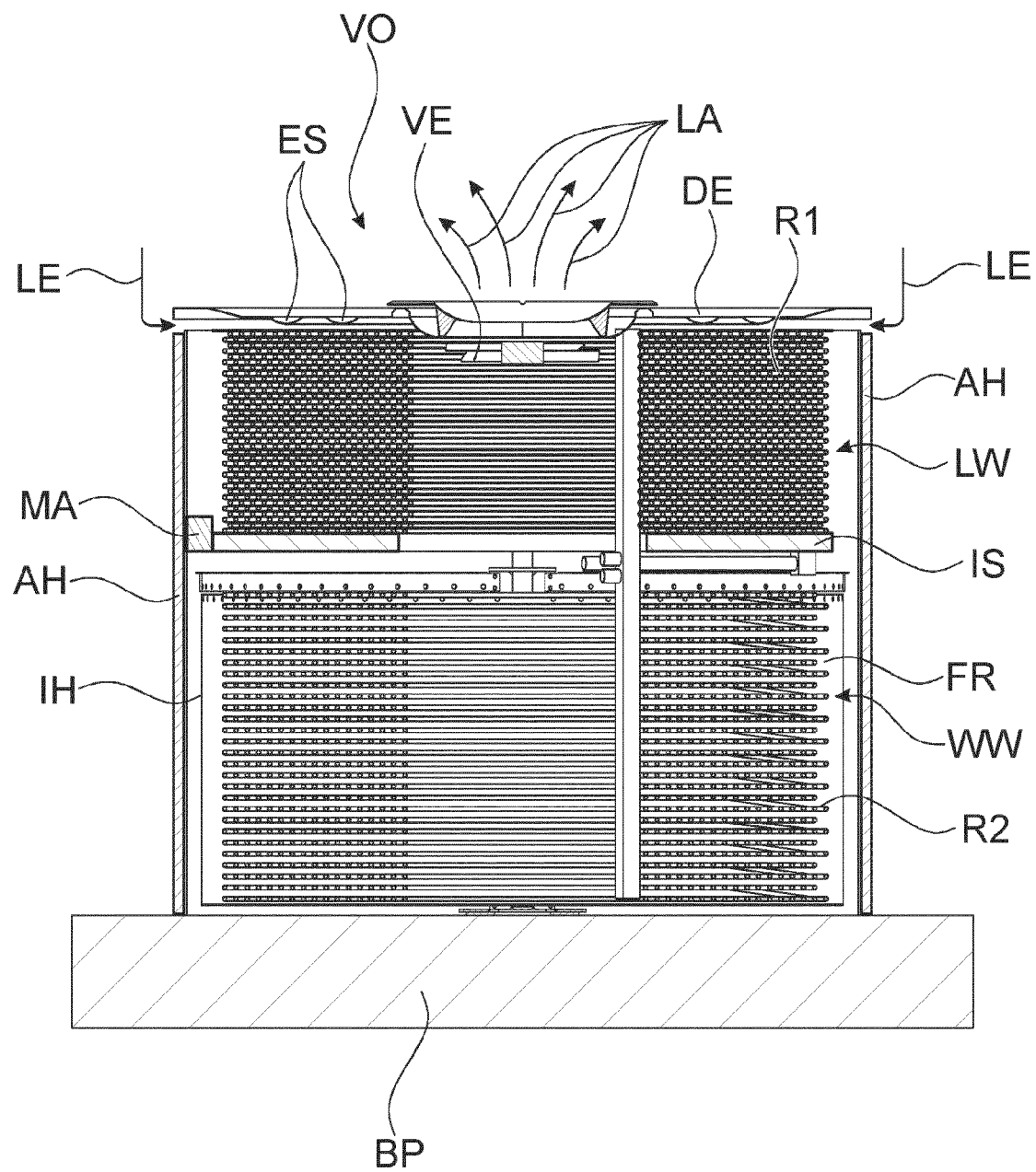
Figure 3:
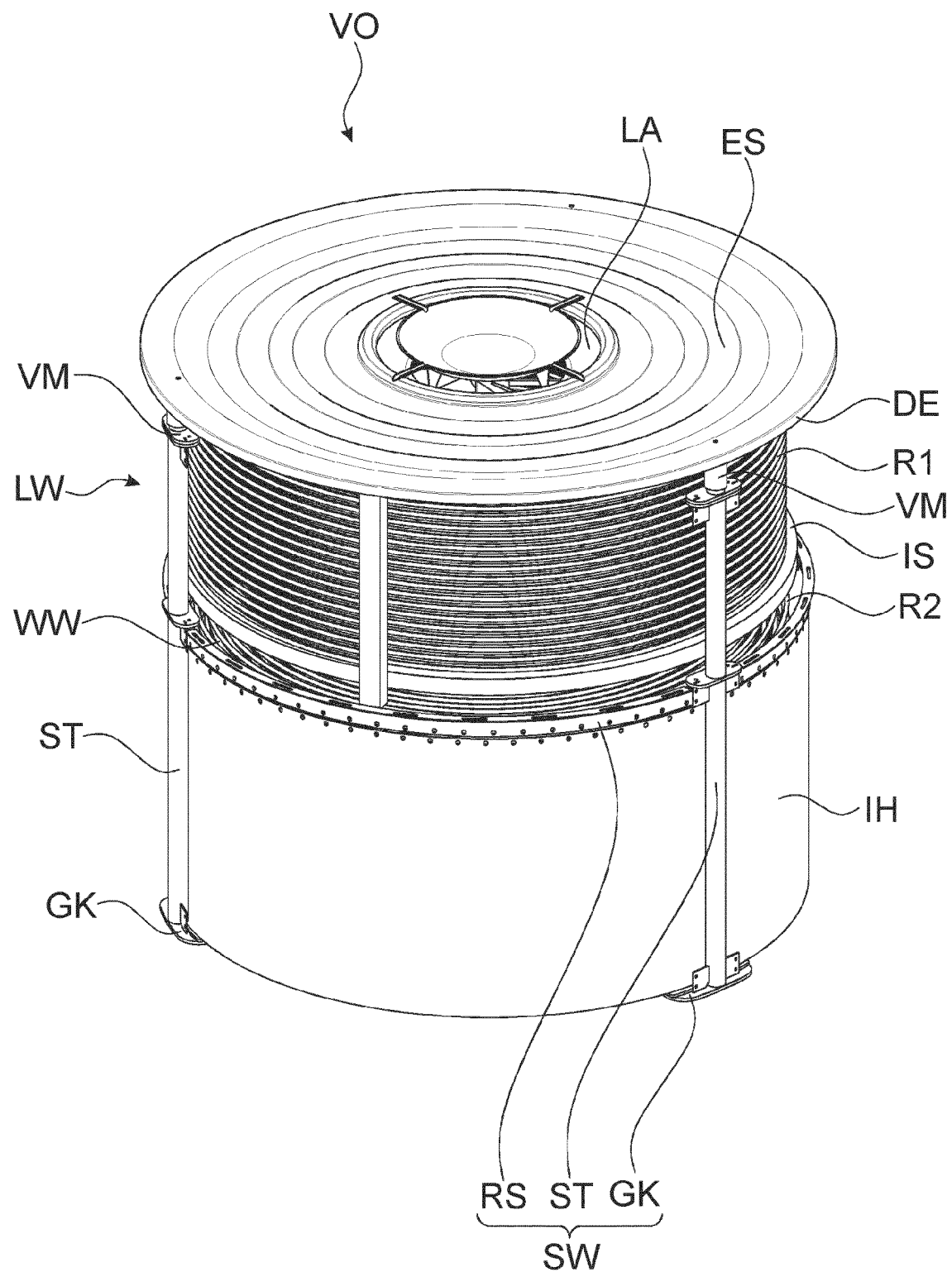
Figure 4:
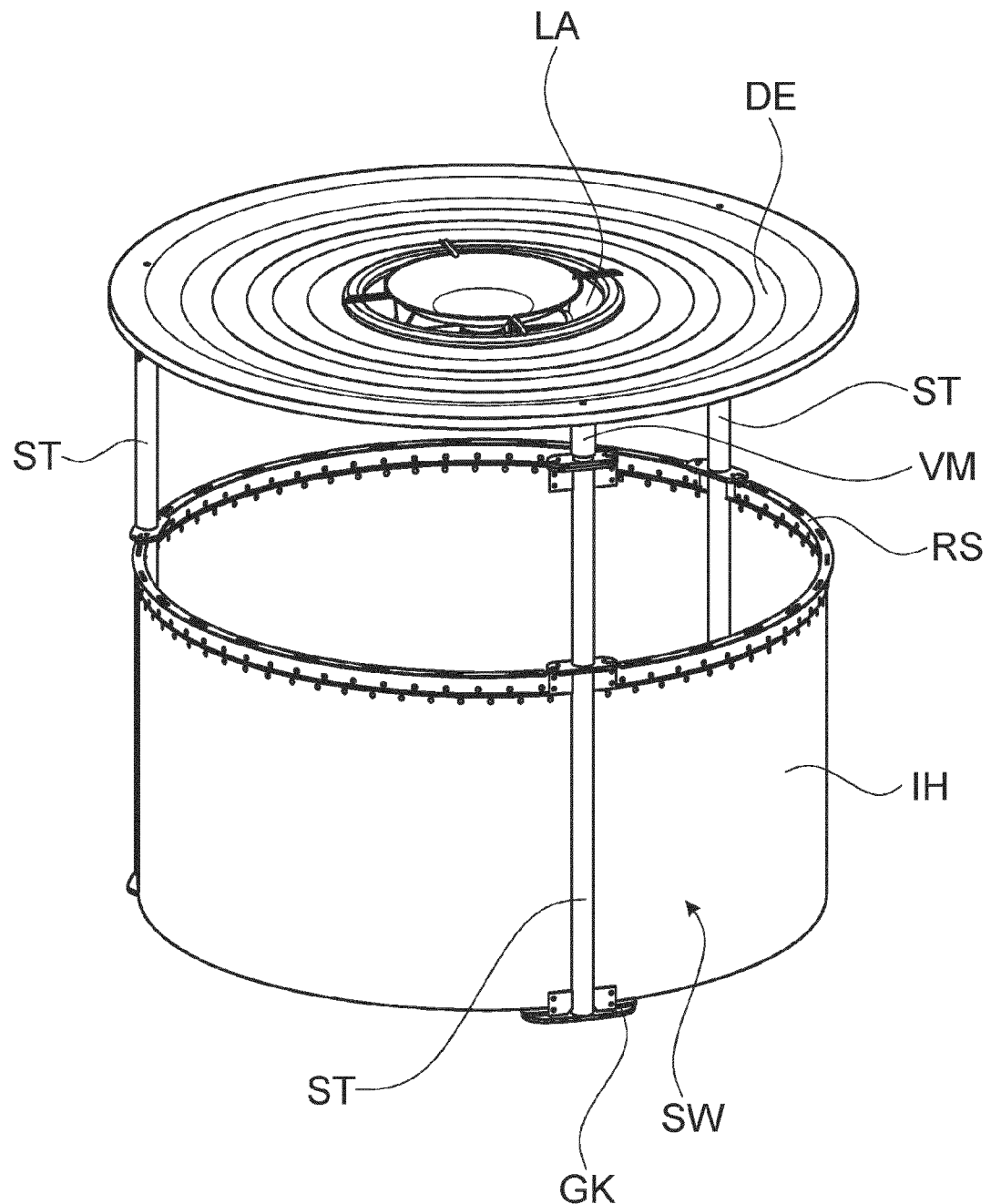
Figure 5:
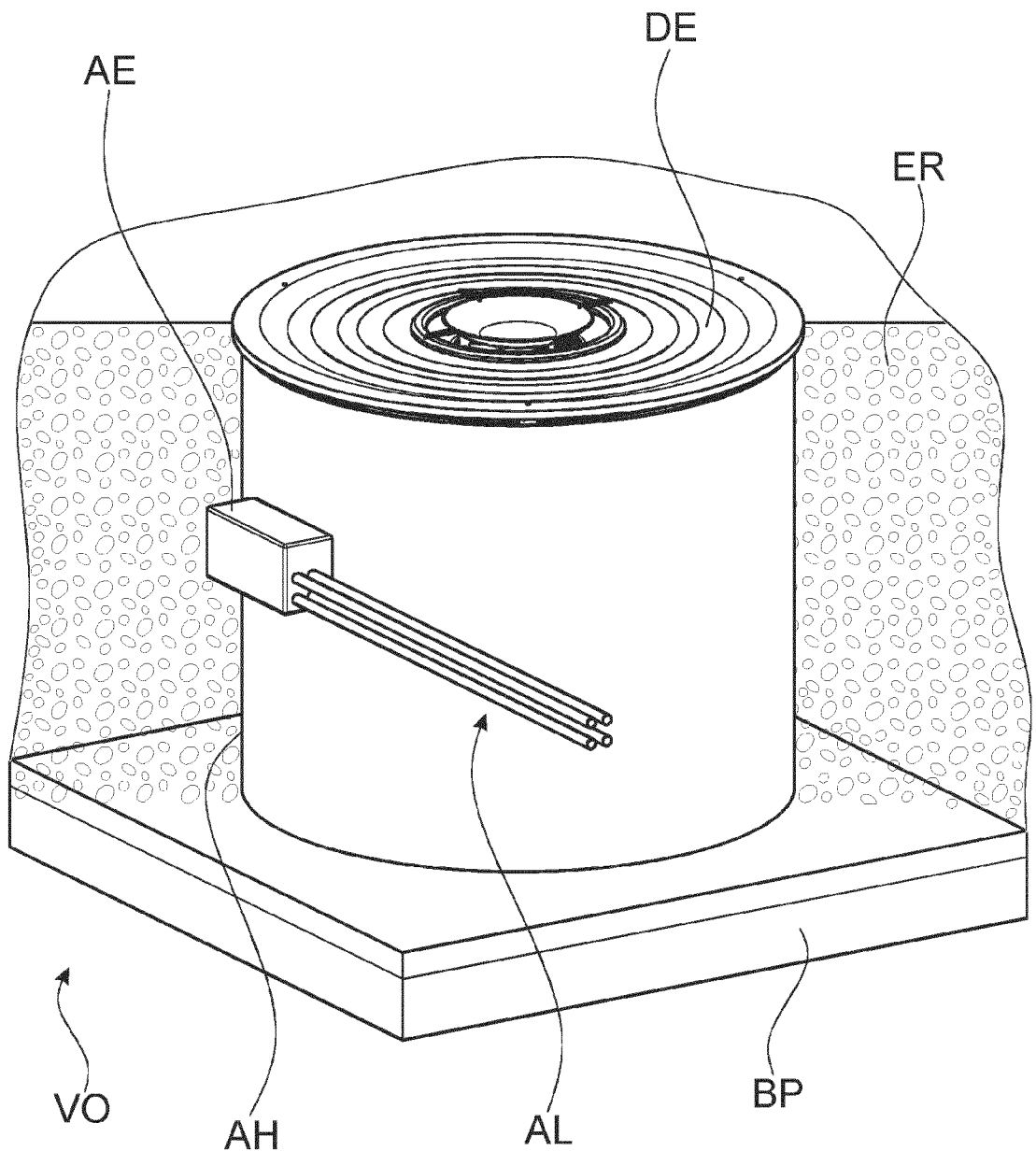

In the following, some exemplary embodiments are explained in greater detail, using the drawing. The figures show:

FIG. 1 a side view of a device according to the invention,

FIG. 2A a sectional view along the line A-A' of the device according to FIG. 1, in accordance with a first embodiment of the invention, FIG. 2B a sectional view along the line A-A' of the device according to FIG. 1, in accordance with a second embodiment of the invention, FIG. 3 a perspective side view of the device according to FIG. 1, FIG. 4 a perspective side view of a first part of the device according to FIG. 1, and FIG. 5 a perspective side view of a second part of the device according to FIG. 1.

In the figures, components that are the same or have the same functional effect are given the same reference symbols.

In FIG. 1, an embodiment of the device VO according to the invention is shown in a side view. The device VO is typically installed in the outside area of a building that is supposed to be heated or cooled by means of the device VO. In order to allow easy installation of the device VO, the base surface to be installed is provided first, wherein here a concrete plate BP can typically be provided as a bottom. Furthermore, soil ER is removed in the outside region of the building, so that an outer shell AH can be introduced, resting on the bottom plate BP. Before introduction of the outer shell AH, a set of lines is typically laid to a heat pump housed in the building, which lines—as will still be explained below—will be connected with the device VO by way of a connection unit AE. For a material-saving structure of the outer shell AH, it can be provided to insert a corresponding space holder into the interior of the outer shell AH until installation of the device VO, to act as a stabilizing core and to prevent dents in the outer shell AH. Typically, the outer shell AH is structured, in terms of its height, in such a manner that the device VO comes to rest entirely or almost entirely in the ground ER. However, for operation of the device VO it is important that an air inlet LE passes ambient air to the interior of the device VO and can discharge it again by way of an air outlet LA. For this purpose, the device VO is provided with a lid DE on its top side, which lid almost completely covers the cross-section of the outer shell AH, wherein only a gap arranged on the circumference remains, which can be used, at least in certain sections, as an air inlet LE.

The lid DE shown in FIG. 1 as well as the top of the ground RE form an almost flat surface, wherein the outer shell AH is typically configured in the form of a cylinder having a circular cross-section, which is placed in the ground ER over its entire axial height. In other embodiments, however, it can be possible that the device VO project partially beyond the top of the ground, so that the air inlet LE could also take place by way of a cylindrical outer region. Instead of an outer shell AG, a protective grid or the like, for example, would then be affixed between the top of the ground ER and the lid DE.

Making reference to FIG. 2A, a sectional view through the plane A-A' will now be explained, which shows the interior of the device VO according to a first embodiment of the invention, in detail. The device VO is composed of an air heat exchanger LW and a water heat exchanger WW, wherein the water heat exchanger WW has a liquid reservoir FR formed within an inner shell IH, which reservoir rests on the bottom plate BP. Toward the top the water heat exchanger WW is separated from the air heat exchanger LW by means of an insulation layer IS, which is further sealed off with reference to the outer shell AH by means of a cuff MA that is to be introduced subsequently. Thereby it is possible to guide the unit, which consists of air heat exchanger LW, insulation layer IS, and water heat exchanger WW, jointly into the interior of the outer shell AH, wherein an insulation between the region of the air heat exchanger LW through which air from the air inlet LE flows and the region of the water heat exchanger WW can be created by means of the cuff MA. The air heat exchanger LW has multiple metal lamellae ML, which are arranged in the form of multiple blocks. In this regard, the lamellae are typically produced from aluminum, for reasons of weight reduction, while the pipes that connect the lamellae can be produced from copper. Ambient air flows around the metal lamellae ML, wherein the ambient air is guided by way of the air inlet LE, by means of a fan VE, to the air outlet LA on the lid DE. Corresponding inflow and outflow lines of the metal lamellae ML are connected with the heat pump situated in the building, as will still be explained below.

The water heat exchanger WW also has second pipes R2 that are wound up in circular form and are arranged within the liquid reservoir FR. The liquid reservoir FR will typically be filled with water, wherein, however, other liquid media, such as paraffin compounds or the like, for example, are not excluded. Here, too, corresponding feed lines and drain lines will once again produce a connection with the heat pump situated in the building, wherein both the first pipes R1 and the second pipes R2 typically have a water/glycol mixture flowing through them so as to achieve energy transfer and/or energy storage.

Furthermore, it can be seen in FIG. 2A that the lid DE is formed with a plurality of depressions ES that can be filled with soil or also with water, so as to allow an optically appealing design, for example a garden of a house. However, the lid DE can also be structured in such a manner that it can be walked on or driven on, so as to become part of paths that already exist, for example.

In FIG. 2B, a sectional view through the plane A-A' is shown, which shows the interior of the device VO according to a second embodiment of the invention, in detail. The device VO is once again composed of an air heat exchanger LW and a water heat exchanger WW. In contrast to the embodiment of FIG. 2A, the air heat exchanger LW has a plurality of first pipes R1 through which ambient air flows, wherein the ambient air is passed by way of the air inlet LE, by means of a fan VE, to the air outlet LA on the lid DE. Corresponding inflow and outflow lines of the first pipes R1 are connected with the heat pump situated in the building. The first pipes R1 can be produced from plastic, for example.

Although the representations of FIGS. 2A and 2B, respectively, do not contain any dimensional information, it can nevertheless be recognized that the two devices VO differ in size. In general, using the structure of the devices VO according to the invention, it is possible to change or adapt the power and layout of the heat storage unit in a targeted manner. For this purpose, both the diameter and the height of the energy storage unit can be changed. Furthermore, an adaptation can be achieved by means of the placement and/or the structure of the air heat exchanger LW and of the water heat exchanger WW.

Independent of the design of the air heat exchanger LW, it can be particularly provided that after the liquid reservoir FR of the water heat exchanger WW is filled, the inner shell IH, because of its flexible form, is pressed in the direction of the outer shell AH, thereby creating additional stabilization of the outer shell AH relative to the surrounding ground ER. As has already been mentioned, the entire device can be inserted essentially in one work step, after the outer shell AH has been provided on the bottom plate BP, as will be described in detail below, making reference to FIG. 3.

FIG. 3 shows a perspective side view of the device VO, wherein here the device VO is shown without the surrounding ground or the outer shell AH. In order to achieve mechanical stabilization, a stud frame SW is provided, which first of all has a base body GK, which can be arranged on the bottom plate BP in star shape, for example, and makes a transition on the outside, in each instance, into a vertical support ST, which reaches from the bottom plate BP along the completer outer shell AH, and is provided with an adjustment means VM at its upper end, which means creates a connection of the strut ST to the lid DE, which connection can be adjusted in terms of its length, so that the lid DE can be oriented in the desired horizontal position, for example;

this is particularly advantageous if the bottom plate BP has experienced a slight deviation in comparison with a horizontal orientation. Furthermore, a separate inner lid can also be adjustable in height, and this can be done jointly or separately. A ring segment RS forms the end of the water heat exchanger WW, wherein the ring segment RS connects the individual struts ST with one another on the circumference, and thereby also ensures additional hold of the stud frame SW. The inner shell IH is suspended in the ring segment RS in the form of a flexible film, so as to achieve the stabilizing outer shell AH described above on the basis of the hydrostatic pressure in the interior of the inner shell IH. Attachment of the film as an inner shell IH on the ring segment RS can take place in different ways, in this regard, wherein aside from suspension, other shape-fit or force-fit connection possibilities are also possible. Furthermore, it can be seen from FIG. 3 that the insulation layer IS insulates the air heat exchanger LW from the water heat exchanger WW, except for the region in the vicinity of the struts ST, wherein, as has already been mentioned, these remaining edge regions can be sealed off by means of a cuff or the like. The device shown in FIG. 3 can essentially be set into the outer shell AH in its entirety, so that after the liquid reservoir FR is filled with water, for example, and the first pipes R1 and the second pipes R2 are connected to the heat pump, the device VO would be ready for operation.

Here the stud frame SW or the struts ST also fulfill(s) the function, for the water heat exchanger WW, of a distributor pipe of the individual pipelines of the second pipes R2 of the water heat exchanger, and thereby function(s) both as a support and as a feed line and drain line of the fluid in the individual pipes R2. Such a function can also be taken over for the air heat exchanger LW if a structure according to FIG. 2B is selected.

In FIG. 4, the structure of the stud frame SW, the lid DE, and the inner shell IH is shown once again, without the components that form the air heat exchanger LW and the water heat exchanger WW. It can be seen that a simple but nevertheless stable structure can be created, which, in particular, clearly reduces the production costs for such an energy transfer and energy storage device.

In FIG. 5, once again a view is shown that uses a ground ER shown partly broken up, so as to explain the structure in greater detail once again.

It can be seen that the connection lines AL are passed to the connection unit AE, creating a connection to a heat pump. The connection unit AE will be connected with the first pipes R1 and the second pipes R2 by means of corresponding connectors, on its inner side. For this purpose, the connection lines are first of all already pre-assembled radially, attached to the device, so that after insertion of the device VO into the outer shell AH, only a connection to the connection unit AE needs to be created. In this manner, a clear reduction of the work required for installation is possible, and this can further reduce the costs for a device according to the invention. A further important property is that the complete energy storage unit (possibly also with the outer shell AH) can be pre-assembled in the factory, and then can be delivered and installed as a unit.

The shape of the device VO can be structured, in terms of the base surface, both round as shown and as a polygon. Other shapes such as elliptical or the like are not excluded.

The characteristics indicated above and in the claims, as well as those that can be derived from the drawings, can advantageously be implemented both individually and in various combinations. The invention is not restricted to the exemplary embodiments described, but rather can be modified in many ways, within the scope of the ability of a person skilled in the art.

The invention claimed is:

1. A device for energy transfer and for energy storage in a liquid reservoir (LR), wherein the device (VO) has a water heat exchanger (WW) arranged on a bottom (BP), and an air heat exchanger (LW) arranged above the water heat exchanger (WW), wherein the water heat exchanger (WW) is arranged in a liquid reservoir (FR) that is surrounded by an inner shell (IH) that delimits the device (VO) relative to an outer shell (AH) that covers the inner shell (IH) from the direction of the bottom, wherein the outer shell (AH) is introduced, at least partially, into an earth layer (ER), and the device (VO) is closed off by means of a lid (DE) in the upward direction, in such a manner that an air stream through the air heat exchanger (LW) can be produced from an air inlet (LE) to an air outlet (LA).

2. The device according to claim 1, in which an insulation layer (IS) is arranged between the water heat exchanger (WW) and the air heat exchanger LW).

3. The device according to claim 2, in which a seal is affixed between the insulation layer (IS) and the outer shell (AH), which seal is preferably formed as an at least partially circumferential cuff (MA).

4. The device according to claim 1, in which a stud frame (SW) is provided at a distance from the outer shell (AH), affixed to the bottom (BP), which frame carries the lid (DE).

5. The device according to claim 4, in which the stud frame (SW) is composed of multiple vertical supports that can be provided with an adjustment mechanism (VM) on the side facing the lid (DE), so as to align the position of the lid (DE).

6. The device according to claim 4, in which the stud frame (SW) is provided with an at least partially circumferential ring segment (RS) that serves as an upper end of the inner sleeve (IH).

7. The device according to claim 6, in which the inner sleeve (IH) is structured as a flexible film that is connected with the ring segment (RS), in particular suspended in it.

8. The device according to claim 1, in which the air inlet (LE) is configured in slit form along the outer circumference of the lid (DE).

9. The device according to claim 1, in which the lid (DE) is arranged with the air outlet (LA) in the center of the lid (DE), wherein a fan (VE) is preferably arranged below the lid (DE), at the air outlet (LA).

10. The device according to claim 1, in which the lid (DE) is provided with one or more depressions (ES), which can be filled with water or soil, to create a natural appearance of the device (VO), or in which the lid (DE) can be driven on or walked on.

11. The device according to claim 1, in which the water heat exchanger (WW) is arranged in water or paraffin compounds as the liquid medium of the liquid reservoir (FR).

12. The device according to claim 1, in which the hydrodynamic pressure in the liquid reservoir (FR) presses the inner shell (IH) against the outer shell (AH).

13. The device according to claim 1, in which the air heat exchanger (LW) and the water heat exchanger (WW) are each structured with a plurality of pipes (R1; R2) arranged in a circle, which are connected with a connection unit (AE) by way of inflow and outflow lines.

14. The device according to claim 13, in which the connection unit (AE), which is preferably arranged at a height between the water heat exchanger (WW) and the air heat exchanger (LW), passes through the outer shell (AH).

15. The device according to claim 1, in which the air heat exchanger (LW) and the water heat exchanger (WW) are structured in such a manner that the device (VO) has an essentially cylindrical outer shape.

\* \* \* \* \*